(12) United States Patent
Fang et al.

(10) Patent No.: US 9,299,048 B2
(45) Date of Patent: Mar. 29, 2016

(54) APPARATUS AND METHOD FOR GENERATING BILL OF MATERIALS FOR INSPECTION

(71) Applicant: Quanta Computer Inc., Tao Yuan Shien (TW)

(72) Inventors: Tien-Chin Fang, Taoyuan County (TW); Jhen-Jhong Chen, Taoyuan County (TW); Yao-Kun Lee, Taoyuan County (TW); Chen-Chung Lee, Nantou County (TW); Ping-Chi Lai, Taoyuan County (TW); Ching-Shium Chen, New Taipei (TW)

(73) Assignee: QUANTA COMPUTER INC., Tao Yuan Shien (TW)

( * ) Notice: Subject to any disclaimer, the term of this patent is extended or adjusted under 35 U.S.C. 154(b) by 385 days.

(21) Appl. No.: 13/906,731

(22) Filed: May 31, 2013

(65) Prior Publication Data
US 2014/0222185 A1    Aug. 7, 2014

(30) Foreign Application Priority Data
Feb. 5, 2013 (TW) .............................. 102104338 A

(51) Int. Cl.
G06Q 10/00 (2012.01)
G06Q 10/06 (2012.01)
(52) U.S. Cl.
CPC .................................. *G06Q 10/0635* (2013.01)
(58) Field of Classification Search
CPC .......... G06Q 10/0635; G06Q 10/0875; G06Q 40/08; G06Q 10/06375
USPC .......................................... 700/107; 705/7.28
See application file for complete search history.

(56) References Cited

U.S. PATENT DOCUMENTS

| | | | |
|---|---|---|---|
| 5,726,884 A * | 3/1998 | Sturgeon et al. | 705/7.12 |
| 7,672,921 B1 * | 3/2010 | Clay et al. | 706/45 |
| 2005/0004770 A1 * | 1/2005 | Ouzounian | 702/22 |
| 2007/0150387 A1 * | 6/2007 | Seubert et al. | 705/31 |
| 2008/0004740 A1 * | 1/2008 | Tamarkin et al. | 700/106 |
| 2008/0120129 A1 * | 5/2008 | Seubert et al. | 705/1 |
| 2009/0018885 A1 * | 1/2009 | Parales | 705/7 |
| 2009/0164305 A1 * | 6/2009 | Wang et al. | 705/10 |
| 2010/0070318 A1 * | 3/2010 | Clemens et al. | 705/7 |
| 2010/0153156 A1 * | 6/2010 | Guinta et al. | 705/8 |
| 2010/0198632 A1 * | 8/2010 | Arora | 705/7 |
| 2010/0274377 A1 * | 10/2010 | Kaufman et al. | 700/103 |
| 2011/0054806 A1 * | 3/2011 | Goldfine et al. | 702/34 |
| 2012/0203567 A1 * | 8/2012 | Seul et al. | 705/2 |
| 2012/0203591 A1 * | 8/2012 | Andoji et al. | 705/7.28 |

* cited by examiner

*Primary Examiner* — Carlos Ortiz Rodriguez
*Assistant Examiner* — Jason Lin
(74) *Attorney, Agent, or Firm* — Rabin & Berdo, P.C.

(57) ABSTRACT

An apparatus and a method for generating a bill of materials for inspection are disclosed. The apparatus for generating a bill of materials for inspection comprises a risk operation module, a data filtering module, and a data outputting module. The risk operation module selects a material risk index, a manufacturer risk index, a laboratory risk index corresponding to a material from the risk database, and decides the risk level according to the material risk index, the manufacturer risk index, and the laboratory risk index. The data filtering module determines whether a material needs to be inspected according to the risk level. The data outputting module selects a material sample from the material, and adds the material sample to the bill of materials for inspection.

20 Claims, 3 Drawing Sheets

APPARATUS AND METHOD FOR GENERATING BILL OF MATERIALS FOR INSPECTION

This application claims the benefit of Taiwan application Serial No. 102104338, filed Feb. 5, 2013, the subject matter of which is incorporated herein by reference.

BACKGROUND OF THE INVENTION

1. Field of the Invention

The invention relates in general to a generation apparatus, and more particularly to an apparatus and a method for generating a bill of materials for inspection.

2. Description of the Related Art

Although the advance in technology improves peoples' living quality and provides more convenience, the environment deteriorates at the same time. To reduce environmental pollution, people must start with reviewing and planning the selection, manufacturing and recycling of materials. The materials causing least environmental pollution are referred as green products (GP) whose manufacturing process satisfies three objectives: energy saving, low pollution and easy recycling. Green products have had a profound impact on the global market of materials, and have caused great change to the production chains of products.

In order to meet the green parts specifications and green regulations of various countries, the manufacturers must constantly sample and inspect the materials used in the production of products. However, the number of materials used in the production of products is huge, and the same material may have more than one supplier. Therefore, how to more efficiently generate a bill of materials for inspection has become a prominent task for the manufacturers.

SUMMARY OF THE INVENTION

The invention is directed to an apparatus and a method for generating a bill of materials for inspection.

According to an embodiment of the present invention, a method for generating a bill of materials for inspection is disclosed. The method for generating a bill of materials for inspection comprises the following steps. A material risk index, a manufacturer risk index, a laboratory risk index, which are corresponding to a material, is selected from a risk database. A risk level is decided according to the material risk index, the manufacturer risk index, and the laboratory risk index. Whether a material needs to be inspected is determined according to the risk level. A material sample is selected from the material. The material sample is added to in the bill of materials for inspection.

According to another embodiment of the present invention, an apparatus for generating a bill of materials for inspection is disclosed. The apparatus for generating a bill of materials for inspection comprises a risk operation module, a data filtering module, and a data outputting module. The risk operation module selects a material risk index, a manufacturer risk index, a laboratory risk index corresponding to a material from the risk database, and decides the risk level according to the material risk index, the manufacturer risk index, and the laboratory risk index. The data filtering module determines whether a material needs to be inspected according to the risk level. The data outputting module selects a material sample from the material, and adds the material sample to the bill of materials for inspection.

The above and other aspects of the invention will become better understood with regard to the following detailed description of the preferred but non-limiting embodiment(s). The following description is made with reference to the accompanying drawings.

DETAILED DESCRIPTION OF THE INVENTION

First Embodiment

Figure 1:
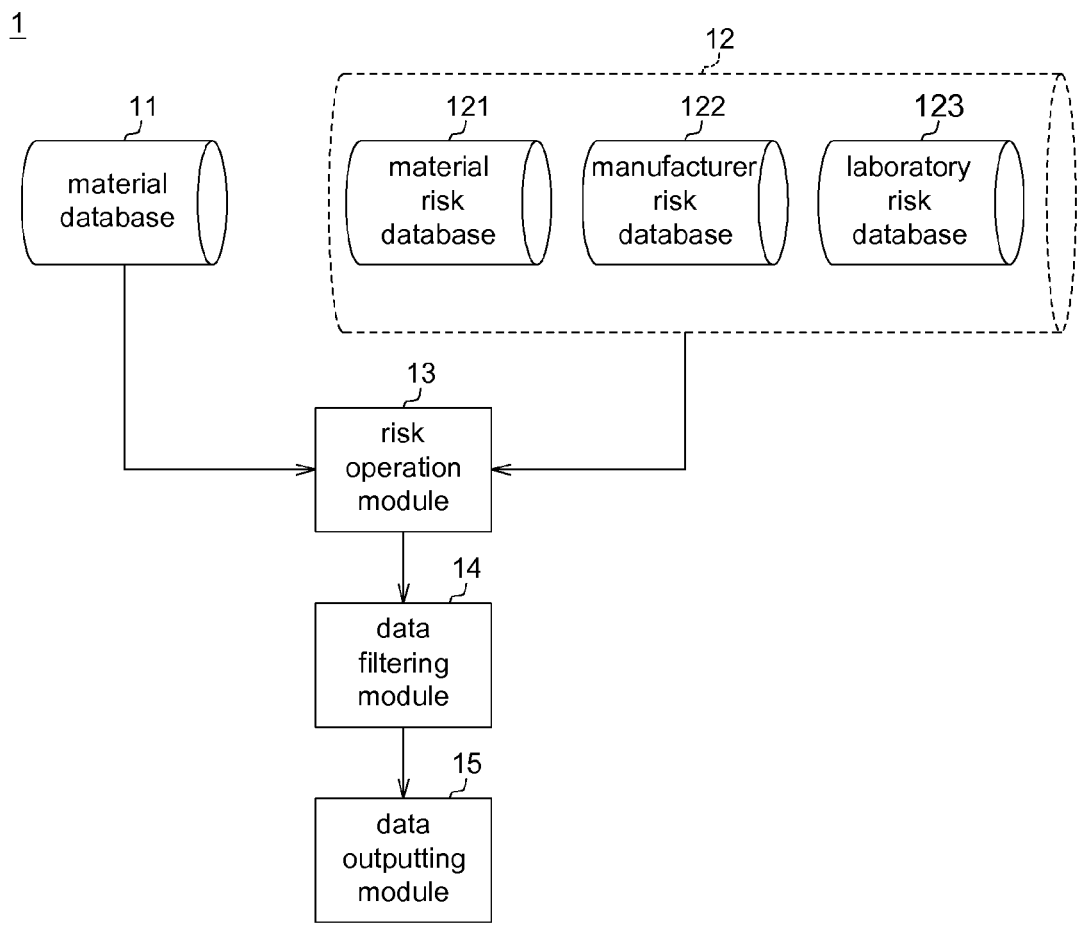
FIG. 1 shows an apparatus for generating a bill of materials for inspection according to a first embodiment of the invention.

Referring to FIG. 1, an apparatus for generating a bill of materials for inspection according to a first embodiment of the invention is shown. The apparatus 1 for generating a bill of materials for inspection comprises a material database 11, a risk database 12, a risk operation module 13, a data filtering module 14 and a data outputting module 15. The risk operation module 13, the data filtering module 14 and the data outputting module 15 are such as realized by software executed by a central processor. After an incoming material arrives, the material database 11 correspondingly stores the part number of the incoming material. The risk operation module 13 decides the risk level of the material corresponding to the part number according to the material database 11. The risk database 12 further comprises a material risk database 121, a manufacturer risk database 122 and a laboratory risk database 123. The material risk database 121, the manufacturer risk database 122 and the laboratory risk database 123 store the material risk index, the manufacturer risk index and the laboratory risk index respectively.

The material risk index is further classified as a high material risk index, a medium material risk index and a low material risk index according to the varieties and manufacturers corresponding to the material. Those materials, which may be polluted by hazardous substances due to control factors or contain a high percentage of hazardous substances, correspond to the high material risk index. Those materials, which are complicated assemblies and are hard to inspect, correspond to the medium risk index. Those materials, which are provided by the manufacturers having approved laboratories and implementing effective periodic check, have simple structures and are formed by low risk substances, correspond to the low material risk index. Besides, those materials, which are formed by using precision technology applying strict control of the manufacturing process, correspond to the low material risk index.

The manufacturer risk index is decided according to the quality audit staff's auditing results on suppliers or their status. The quality audit staff are entitled to maintain and manage the site audit Index. The laboratory risk index is decided according to the analysis results or status of laboratories. For example, the larger the number of pass times, the lower the laboratory risk index, and the smaller the number of pass times, the higher the laboratory risk index.

Figure 2:
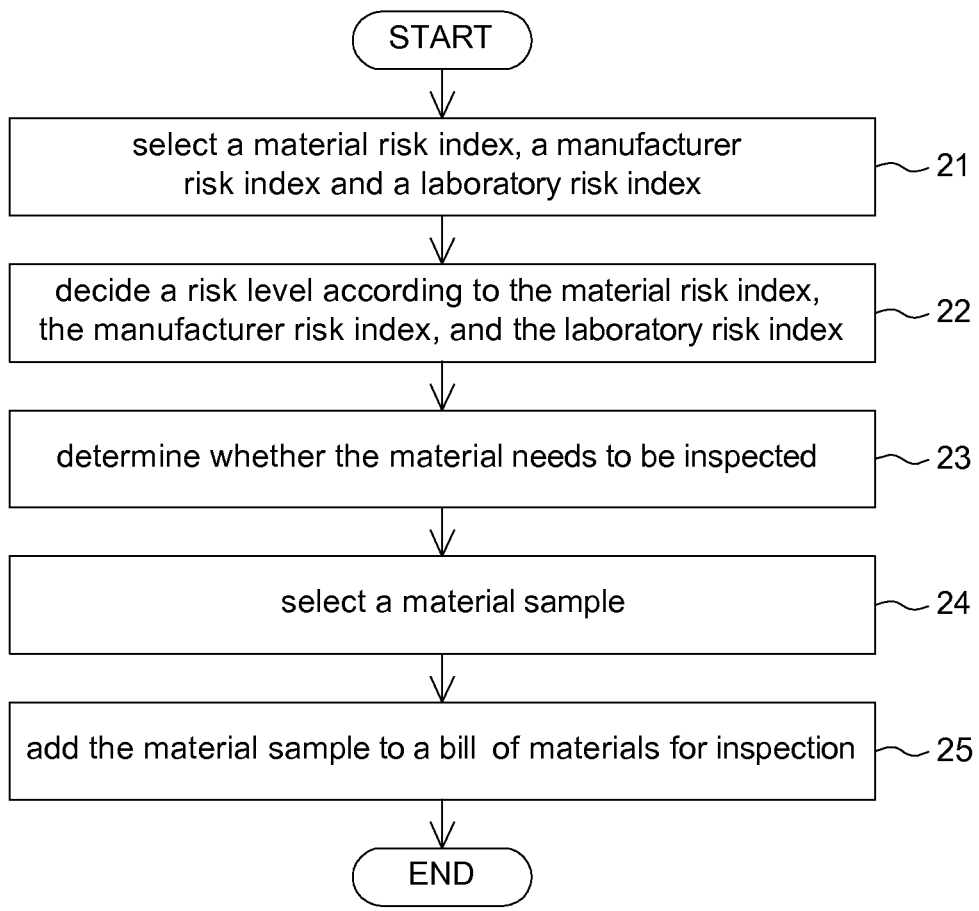
FIG. 2 shows a flowchart of a method for generating a bill of materials for inspection according to a first embodiment of the invention.

Referring to FIG. 1 and FIG. 2. FIG. 2 shows a flowchart of a method for generating a bill of materials for inspection according to a first embodiment of the invention. The method for generating a bill of materials for inspection can be used in the apparatus 1 for generating a bill of materials for inspection, and at comprises the following steps: Firstly, the method begins at step 21, the risk operation module 13 selects a material risk index, a manufacturer risk index, a laboratory risk index, which are corresponding to a material, from the risk database 12. To put is in greater details, the risk operation module 13 selects the material risk index, the manufacturer risk index and the laboratory risk index from the material risk database 121, the manufacturer risk database 122 and the laboratory risk database 123, respectively.

Next, the method proceeds to step 22, the risk operation module 13 decides a risk level according to the material risk index, the manufacturer risk index, and the laboratory risk index. To put it in greater details, the risk operation module 13 firstly calculates a total index according to the material risk index, the manufacturer risk index, and the laboratory risk index, and then decides the risk level according to the total index. The total index is such as a product of the material risk index, the manufacturer risk index, and the laboratory risk index. The risk operation module 13 such as decides the risk level of a material according to the total index and a reference table exemplified below in Table 1:

TABLE 1

| Material Risk Index | Manufacturer Risk Index | Laboratory Risk Index | Total Index | Risk Level |
|---|---|---|---|---|
| 1 | 1 | 1 | 1 | Low |
| 1 | 2 | 1 | 2 | Low |
| 1 | 3 | 1 | 3 | Low |
| 1 | 1 | 2 | 2 | Low |
| 1 | 2 | 2 | 4 | Low |
| 1 | 3 | 2 | 6 | Low |
| 1 | 1 | 3 | 3 | Low |
| 1 | 2 | 3 | 6 | Low |
| 1 | 3 | 3 | 9 | Medium |
| 2 | 1 | 1 | 2 | Low |
| 2 | 2 | 1 | 4 | Low |
| 2 | 3 | 1 | 6 | Low |
| 2 | 1 | 2 | 4 | Low |
| 2 | 2 | 2 | 8 | Medium |
| 2 | 3 | 2 | 12 | Medium |
| 2 | 1 | 3 | 6 | Low |
| 2 | 2 | 3 | 12 | Medium |
| 2 | 3 | 3 | 18 | High |
| 3 | 1 | 1 | 3 | Low |
| 3 | 2 | 1 | 6 | Low |
| 3 | 3 | 1 | 9 | Medium |
| 3 | 1 | 2 | 6 | Low |
| 3 | 2 | 2 | 12 | Medium |
| 3 | 3 | 2 | 18 | High |
| 3 | 1 | 3 | 9 | Medium |
| 3 | 2 | 3 | 18 | High |
| 3 | 3 | 3 | 27 | High |

As indicated in Table 1, when the total index is between 1~6, the risk level belongs to a low risk level; when the total index is between 7~12, the risk level belongs to a medium risk level; when the total index is greater than 12, the risk level belongs to a high risk level. For example, when the material risk index, the manufacturer risk index, the laboratory risk index of a material are all equal to 3, the risk operation module 13 calculates the total index as 27. Then, the risk operation module 13 decides the risk level of the material as a high risk level according to the total index and Table 1.

Referring to FIG. 1 and FIG. 2 again at the same time. After step 22 is completed, then the method proceeds to step 23. In step 23, the data filtering module 14 determines whether a material needs to be inspected according to the risk level. To put it in greater details, the risk operation module 13 decides the risk level of a material as a high risk level, a medium risk level or a low risk level. If the risk level belongs to a high risk level, then the data filtering module 14 determines that the material needs to be inspected. If the risk level belongs to a medium risk level, then the data filtering module 14 further determines whether a duration from a previous inspection time till now is longer than a first default period such as 6 months. If the duration is longer than the first default period, then the data filtering module 14 determines that the material needs to be inspected. If the risk level belongs to a low risk level, then the data filtering module 14 further determines whether a duration from a previous inspection time till now is longer than a second default period such as 12 months, wherein the second default period is longer than the first default period. If the duration is longer than the second default period, then the data filtering module 14 determines that the material needs to be inspected.

After step 23 is completed, the method proceeds to step 24. In step 24, the data outputting module 15 selects a material sample from the material, and the data filtering module 14 determines whether the material includes any non-inspected materials. If the material includes any non-inspected materials, then the data filtering module 14 randomly selects a sample from the material as the material sample. Conversely, if the material does not include any non-inspected materials, then the data filtering module 14 selects the material having the earliest inspection time as the material sample. After step 24 is completed, the method proceeds to step 25. In step 25, the data outputting module 15 adds the material sample to the bill of materials for inspection.

Second Embodiment

Figure 3:
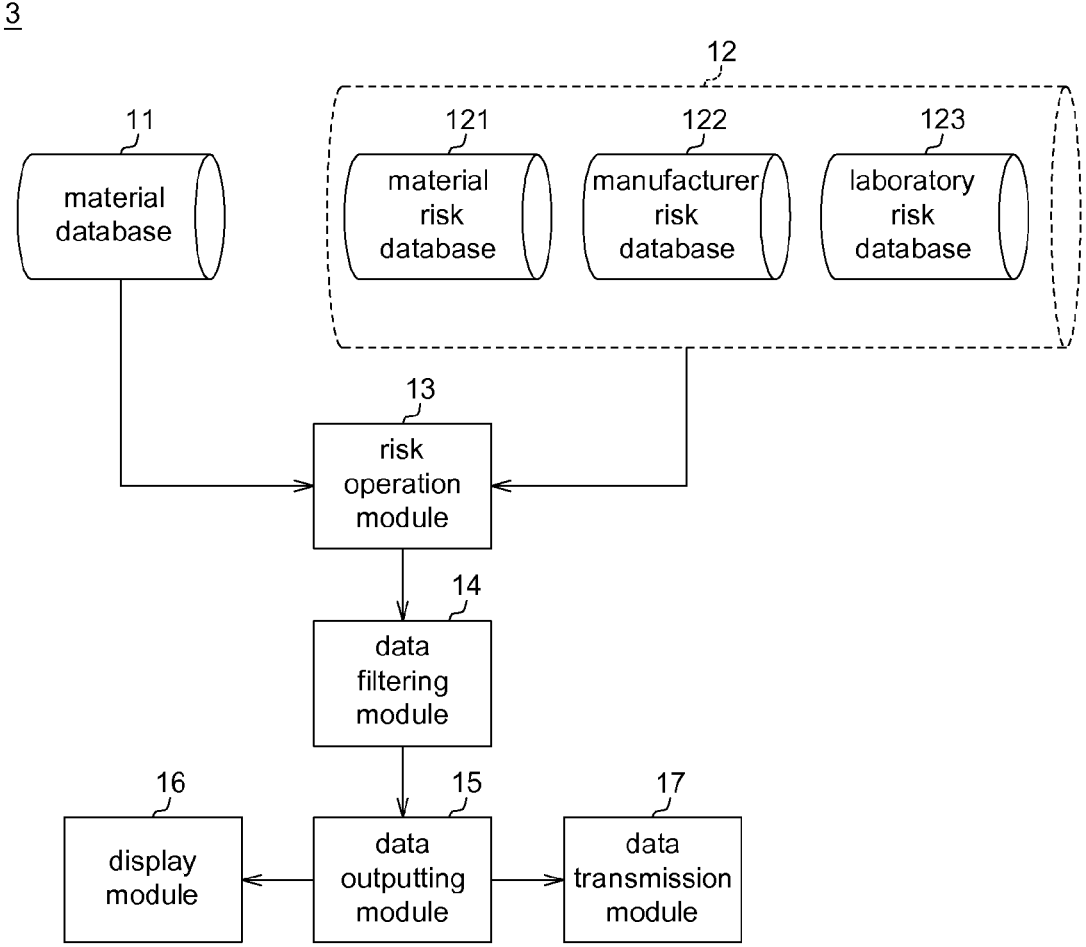
FIG. 3 shows an apparatus for generating a bill of materials for inspection according to a second embodiment of the invention.

Referring to FIG. 1 and FIG. 3 at the same time. FIG. 3 shows an apparatus for generating a bill of materials for inspection according to a second embodiment of the invention. The second embodiment is different from the first embodiment mainly in that the apparatus 3 for generating a bill of materials for inspection comprises a display module 16 and a data transmission module 17 in addition to the material database 11, the risk database 12, the risk operation module 13, the data filtering module 14 and the data outputting module 15. The display module 16 is such as a screen, and the data transmission module 17 is such as a network interface. Apart from displaying the bill of materials for inspection, the display module 16 can further display the stock status corresponding to the bill of materials for inspection. The data transmission module 17 transmits the bill of materials for inspection to a laboratory inspection system.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for generating a bill of materials for inspection, comprising:
 (a) selecting a material risk index, a manufacturer risk index and a laboratory risk index, which are corresponding to a material, from a risk database; wherein the manufacturer risk index is decided according to auditing results on suppliers or suppliers' status, and the laboratory risk index is decided according to analysis results of laboratories or status of laboratories;

(b) deciding a risk level according to the selected material risk index, the selected manufacturer risk index, and the selected laboratory risk index;

(c) determining whether the material needs to be inspected according to the risk level;

(d) based on the determining step, selecting a material sample from the material that need to be inspected, wherein the step (d) comprises:

determining whether the material includes any uninspected materials;

randomly selecting the material sample if the material includes uninspected materials; and selecting the material having the earliest inspection time as the material sample if the material does not include any uninspected materials; and (e) adding the material sample to a bill of materials for inspection.

2. The generation method according to claim 1, wherein the risk database comprises a material risk database, a manufacturer risk database and a laboratory risk database, and in the step (b), the material risk index, the manufacturer risk index and the laboratory risk index are selected from the material risk database, the manufacturer risk database and the laboratory risk database, respectively.

3. The generation method according to claim 1, wherein the step (b) comprises:

calculating a total index according to the material risk index, the manufacturer risk index, and the laboratory risk index; and deciding the risk level according to the total index.

4. The generation method according to claim 3, wherein the risk level is decided according to the total index and a reference table.

5. The generation method according to claim 1, wherein in the step (c), the risk level is decided as a high risk level, a medium risk level or a low risk level based on the total index, wherein the risk level is decided as the high risk level when the total index is above a first threshold, the risk level is decided as the medium risk level when the total index is between the first threshold and the a second threshold, the risk level is decided as the low risk level when the total index is below the second threshold, and a determination that the material needs to be inspected is made if the risk level belongs to the high risk level.

6. The generation method according to claim 5, wherein if the risk level belongs to the medium risk level, then whether a duration from a previous inspection time till now is longer than a first default period is determined, and a determination that the material needs to be inspected is made if the duration is longer than the first default period.

7. The generation method according to claim 6, wherein if the risk level belongs to the low risk level, then whether a duration from a previous inspection time till now is longer than a second default period longer than the first default period is determined, and a determination that the material needs to be inspected is made if the duration is longer than the second default period.

8. The generation method according to claim 1, further comprising:

displaying the bill of materials for inspection.

9. The generation method according to claim 8, further comprising:

displaying a stock status corresponding to the bill of materials for inspection.

10. The generation method according to claim 1, further comprising:

transmitting the bill of materials for inspection to a laboratory inspection system.

11. A non-transitory computer-readable medium for generating a bill of materials for inspection, comprising instructions stored thereon, that when executed on a processor, perform the steps of:

selecting a material risk index, a manufacturer risk index, and a laboratory risk index, which correspond to a material, from a risk database; wherein the manufacturer risk index is decided according to auditing results on suppliers or suppliers' status, and the laboratory risk index is decided according to analysis results of laboratories or status of laboratories;

deciding a risk level according to the selected material risk index, the selected manufacturer risk index, and the selected laboratory risk index;

determining whether the material needs to be inspected according to the risk level;

selecting a material sample from the material; and adding the material sample to a bill of materials for inspection, wherein the step of selecting the material sample from the material comprises:

determining whether the material includes any uninspected materials; randomly selecting a sample from the material as the material sample if the material includes any uninspected materials; and selecting the material having the earnest inspection time as the material sample if the material does not include any uninspected materials.

12. The non-transitory computer-readable medium according to claim 11, wherein the risk database comprises:

a material risk database;

a manufacturer risk database; and a laboratory risk database, wherein the steps further include selecting the material risk index, the manufacturer risk index and the laboratory risk index from the material risk database, the manufacturer risk database and the laboratory risk database respectively.

13. The non-transitory computer-readable medium according to claim 11, wherein the steps further include calculating a total index according to the material risk index, the manufacturer risk index and the laboratory risk index, and deciding the risk level according to the total index.

14. The non-transitory computer-readable medium according to claim 13, wherein the steps further include deciding the risk level according to the total index and a reference table.

15. The non-transitory computer readable medium according to claim 11, wherein the steps further include deciding the risk level as a high risk level, a medium risk level or a low risk level based on the total index, wherein the risk level is decided as the high risk level when the total index is above a first threshold, the risk level is decided as the medium risk level when the total index is between the first threshold and the a second threshold, the risk level is decided as the low risk level when the total index is below the second threshold, and determining the material to be inspected if the risk level has been determined to belong to the high risk level.

16. The non-transitory computer-readable medium according to claim 15, wherein the steps further include determining, if the risk level belongs to the medium risk level, whether a duration from a previous inspection time till now is longer than a first default period, and determining the material to be inspected if the duration has been determined to be longer than the first default period.

17. The non-transitory computer-readable medium according to claim 16, wherein the steps further include determining, if the risk level belongs to the low risk level, whether a duration from a previous inspection time till now is longer than a second default period being longer than the first default period, and determining the material to be inspected if the duration has been determined to be longer than the second default period.

18. The non-transitory computer-readable medium according to claim 11,
wherein the steps further include displaying the bill of materials for inspection on a display module.

19. The non-transitory computer-readable medium according to claim 18, wherein the steps further include displaying a stock status corresponding to the bill of materials for inspection on the display module.

20. The non-transitory computer-readable medium according to claim 11, wherein the steps further comprise:
transmitting the bill of materials for inspection to a laboratory inspection system.

\* \* \* \* \*